Patented May 22, 1951

2,554,268

UNITED STATES PATENT OFFICE 2,554,268

PROCESS FOR PREPARING DIOLEFIN-NITRILE COPOLYMERS CONTAINING LESS THAN TWENTY-FIVE PER CENT NITRILE

Harold J. Rose, Baton Rouge, La., and Byron M. Vanderbilt, Westfield, N. J., assignors to Standard Oil Development Company, a corporation of Delaware No Drawing. Application November 9, 1945, Serial No. 627,788

5 Claims. (Cl. 260—82.7)

The present invention pertains to the production of synthetic rubber-like materials and particularly to the production of soft rubber-like products by the polymerization of mixtures of a conjugated diolefin and a nitrile of acrylic or methacrylic acids in aqueous emulsion.

It has been known for some time that diolefins such as butadiene or isoprene may be copolymerized with acrylonitrile or methacrylonitrile in aqueous emulsion to form polymerizates which are rubber-like in character and mostly superior to natural rubber in their resistance to oils and to solvents. The preparation of such copolymers is described, for example, in U. S. Patent 1,973,000. Copolymers prepared in accordance with the teachings of this patent have been found to possess substantially uniform composition and good physical properties, i. e., tensile strength, elongation and plasticity when the ratio of diolefin/nitrile is between about 75/25 and 70/30.

When low nitrile copolymers, i. e., copolymers containing less than 25% of combined nitrile were prepared it was found that the products obtained were inferior to those of higher nitrile content not only in their resistance to mineral and coal tar oils but also in their overall physical properties such as tensile strength, elongation and modulus. It was further found that there was a very definite decrease in the plasticity of the copolymer rendering it very difficult to process or work up in ordinary rubber-working equipment.

It is the object of the present invention to provide the art with a novel method of preparing synthetic rubber-like copolymers of superior properties by polymerizing mixtures of more than 75% of a butadiene-1,3 and less than 25% of acrylonitrile or methacrylonitrile in aqueous emulsion.

It is also the object of this invention to prepare synthetic rubber-like copolymers of a butadiene-1,3 and a nitrile containing less than 25% of combined nitrile and having good oil and solvent resistance, high tensile strength and elongation, good plasticity and the property of readily working up in ordinary rubber-working equipment.

These and other objects will appear more clearly from the following detailed description.

We have now found that emulsion copolymerizates of a butadiene-1,3 and acrylonitrile or methacrylonitrile containing less than 25% of combined nitrile are more uniform in composition and therefore possess improved general characteristics by maintaining close control of the concentration of nitrile in the reaction system. Specifically it has been found that emulsion copolymerizates of a butadiene-1,3 and acrylonitrile or methacrylonitrile containing less than 25% of combined nitrile possess improved oil resistance, tensile strength, elongation, modulus and compression set properties provided that the nitrile is added portionwise to the reaction mixture. The improvement in the physical properties of the polymer obtained by the portionwise rather than single addition of the nitrile is greater in copolymers of lower combined nitrile content, i. e., the improvement is greater in copolymers containing 12–15% of combined nitrile than in those containing 20% of combined nitrile and greater in copolymers containing 20% of combined nitrile than in those containing 25% of combined nitrile.

The diolefins which may be used in accordance with the present invention are butadiene-1,3 and isoprene or mixtures of these diolefins. Other conjugated diolefins such as piperylene and dimethylbutadiene copolymerize with acrylonitrile or methacrylonitrile but result in copolymers having inferior physical properties. The nitriles which may be used are acrylonitrile and alpha alkyl acrylonitriles. Of this class methacrylonitrile is particularly operable. Mixtures of acrylonitrile and methacrylonitrile may be used.

The polymerization is carried out in aqueous emulsion, the ratio of water to monomeric materials varying between about 1.5/1 to about 2.5/1. Emulsifiers which may be used include water soluble soaps such as alkali metal or ammonium oleate, palmitate, stearate or soaps of mixtures of fatty acids such as those obtainable by the selective hydrogenation of tallow acids. Other suitable emulsifiers include such surface active materials as sodium lauryl sulfate, salts of alkylated naphthalene and benzene sulfonic acids, acid addition salts of high molecular alkyl amines such as dodecyl amine hydrochloride or acetate and the like.

A polymerization catalyst or compound capable of liberating oxygen under the conditions applied in the polymerization reaction such as hydrogen peroxide, or alkali metal or ammonium perborates or persulfates is used in amounts of between about 0.1 and about 1.0 wt. per cent based upon the monomers. It is also desirable to provide a polymerization modifier such as an aliphatic mercaptan containing at least six and preferably about 12–14 carbon atoms per molecule in amounts of between about 0.25 and 1.0 per cent based upon the monomers present. According to a preferred embodiment, the nitrile and the mercaptan modifier are added portionwise.

In accordance with this invention, all the diolefin and about 10-75% of all the nitrile are added to the reaction mixture initially and the remainder of the nitrile is added in two or more portions in the conversion range of 10-65%. For example, about 80 to 90 parts by weight of butadiene-1,3 and 6 to 10 parts of acrylonitrile are added to the reaction mixture initially and a further amount of 4 to 11 parts by weight of acrylonitrile is added to the reaction mixture in at least three increments while the polymerization reaction is in the conversion range between 20 and 50%. In accordance with the preferred procedure, the polymerization is started with an initial ratio of diene-nitrile which will give the copolymer of the desired nitrile content during the first conversion stage. The ratio varies according to the nitrile content desired in the copolymer and may readily be determined experimentally for each copolymer. Since the copolymer first formed will be higher in nitrile content than the feed or reaction mixture, nitrile addition to the reaction mixture is started immediately in order to maintain the diene-nitrile ratio such that a uniform copolymer is formed at all times.

The following examples will illustrate this invention but it is to be understood that this invention is not limited thereto:

*Example I*

A copolymer containing a ratio of butadiene-acrylonitrile of approximately 79/21 was prepared according to the following recipe, the parts given being by weight:

200 parts water
79 parts butadiene
10 parts acrylonitrile
4 parts sodium salt of selectively hydrogenated tallow acids—80% neutralized
0.3 part potassium persulfate
0.24 part mercaptans prepared from commercial lauryl alcohol Reaction was run in a 3-gallon autoclave equipped with turbo agitation, employing a temperature of 35° C. The following additions were made during the reaction period:

(1) At 20% conversion:
 3 parts acrylonitrile
 0.12 part mercaptan
(2) At 35% conversion, 4 parts acrylonitrile
(3) At 50% conversion:
 4 parts acrylonitrile
 0.12 part mercaptan Samples taken at various conversions during this run contained the following amounts of combined nitrile:

| Per Cent Conversion | Per Cent Acrylonitrile in Product |
|---|---|
| 38.5 | 20.8 |
| 57.3 | 21.4 |
| 66.5 | 22.1 |
| 73 | 21.8 |

When the run was repeated, except that all the nitrile was added to the reaction mixture at the outset and the mercaptan added as previously, the products obtained at various conversions contained the following amounts of combined acrylonitrile:

| Per Cent Conversion | Per Cent Acrylonitrile in Product |
|---|---|
| 13 | 33.5 |
| 20 | 29.1 |
| 36.5 | 27.9 |
| 45 | 27.3 |
| 60.5 | 25.3 |
| 73 | 23.3 |

Calculation shows that the copolymers actually formed in the range of 60.5-73% conversion contained only 13.7% of nitrile.

It may also be noted that the product obtained by portion-wise addition of the nitrile is not only of more uniform nitrile content at various conversions than that of the latter run, but also the product contains nitrile more nearly equal to that of the overall feed.

Since the product from the run using all of the nitrile in the initial feed was about 1.5% higher in nitrile content than the product obtained by portion-wise addition of the nitrile, a third run was made in which an 81/19 ratio of butadiene-acrylonitrile was used and all monomers added initially. At 76% conversion this product contained 22.0% acrylonitrile.

Comparative physical data for the products from these three runs are as follows:

| | Cure Time | Polymer No. 1 [1] | Polymer No. 2 [2] | Polymer No. 3 [3] |
|---|---|---|---|---|
| | *Minutes* | | | |
| Tensile Strength in Tire Tread Recipe [4] | 15 | 3,350# | 3,440# | 2,790# |
| | 30 | 3,290 | 3,560 | 3,140 |
| | 60 | 2,920 | 3,280 | 3,360 |
| Per Cent Elongation in Tire Tread Recipe [4] | 15 | 730% | 840% | 780% |
| | 30 | 630 | 720 | 710 |
| | 60 | 570 | 690 | 690 |
| Modulus at 300% Elongation in Tire Tread Recipe [4] | 15 | 580# | 420# | 570# |
| | 30 | 690 | 730 | 700 |
| | 60 | 800 | 730 | 750 |
| Tensile Strength in Mechanical Goods Recipe [5] | 30 | 2,660# | 2,830# | -------- |
| | 60 | 2,710 | 2,990 | -------- |
| | 90 | 2,660 | 3,010 | -------- |
| Per Cent Elongation in Mechanical Goods Recipe [5] | 30 | 410% | 380% | -------- |
| | 60 | 360 | 360 | -------- |
| | 90 | 340 | 340 | -------- |
| Volume Increase in 40% Aromatic Gasoline after 48 hours at Room Temp. [6] | 30 | 90% | 90% | 99% |
| | 60 | 88 | 89.5 | 96.5 |
| | 90 | 86 | 88 | 97.5 |
| Volume Increase in Sun Circo Light Oil after 70 hours at 212° F. [6] | 30 | 40.5% | 40 | 50 |
| | 60 | 39 | 38.5 | 49 |
| | 90 | 38 | 39 | 47 |
| Compression Set, 30% Constant deflection, 22 hours at 158° F. [6] | 30 | 13.6% | 12.3% | 11.2% |
| | 60 | 13.9 | 8.4 | 9.7 |
| | 90 | 9.6 | 7.9 | 10.0 |
| Per Cent Combined Acrylonitrile | | 23.3 | 21.8 | 22.0 |

[1] Polymer obtained using 79/21 ratio of butadiene-acrylonitrile with all monomers added in initial feed.
[2] Polymer obtained using 79/21 ratio of butadiene-acrylonitrile with only 10 parts of acrylonitrile in the initial feed and 11 parts added in three increments during the reaction period.
[3] Polymer obtained using 81/19 ratio of butadiene-acrylonitrile with all monomers added in initial feed.
[4] Tire tread recipe used:

| | Parts |
|---|---|
| Polymer | 100 |
| Coal tar | 4 |
| Wood rosin | 4 |
| Ozokerite wax | 1.5 |
| Channel gas black | 45 |
| Zinc oxide | 5 |
| Stearic acid | 1.5 |
| Benzothiazyl disulfide | 1.25 |
| Diphenyl guanidine | 0.25 |
| Sulfur | 1.5 |

Temperature, 287° F.
[5] Mechanical goods recipe used:

| | Parts |
|---|---|
| Polymer | 100 |
| Semi-reinforcing carbon black | 75 |
| Zinc oxide | 5 |
| Stearic acid | 1.5 |
| Benzothiazyl disulfide | 1 |
| Sulfur | 1.5 |

Temperature, 287° F.
[6] Vulcanizates from mechanical goods recipe used.

From the above data it may be observed that the product prepared when adding a part of the nitrile during the reaction period gave higher tensiles in both the tire tread and in the mechanical goods recipes. Elongations are comparable showing degrees of cure were comparative. From the volume increase data, polymer No. 2 is equally oil-resistant to polymer No. 1 even though the latter contains 1.5 parts more nitrile than does No. 2. Polymers No. 2 and No. 3 are comparable in nitrile contents, but it may be observed that No. 2 is definitely superior in oil-resistance. This shows a definite advantage of adding a part of the nitrile portion-wise during the reaction period in order to avoid forming some low nitrile copolymer which contributes little or nothing to the oil-resistance of the vulcanizates. Since diolefin-nitrile type polymers are primarily used because of their resistance to swelling in oils, it is a definite advantage to obtain the maximum oil-resistance for a given nitrile content. This is because butadiene-nitrile copolymers become increasingly brittle at low temperatures as the nitrile content is increased. Furthermore, butadiene is cheaper than the nitrile and for economic reasons, one prefers to use it in the highest proportion possible in order to achieve a given degree of oil-resistance.

It may be observed from the compression set properties of the three vulcanizates with the semi-reinforcing black loading that the No. 2 polymer is superior. This property is of considerable importance in uses where the vulcanizate is under stress.

Milling behavior on laboratory mills indicated the No. 2 polymer to be more processable than the other two. Factory fabrication of copolymers manufactured in a manner similar to that of polymer No. 2 has been more satisfactory than when handling butadiene-acrylonitrile rubbers of like nitrile content which were prepared with all of the nitrile in the initial feed.

*Example II*

A copolymer of butadiene and acrylonitrile was prepared in a stainless steel lined autoclave provided with a turbo type agitator in accordance with the following recipe, the parts being by weight:

200 parts water
80 parts butadiene
10 parts acrylonitrile
4.6 parts tallow acids 70% neutralized at the start of run—additional alkali added during run to render acids 92% neutralized at the end
0.5 part mercaptans from commercial lauryl alcohol
0.6 part potassium persulfate The reaction was carried out at 100° F. for 12 hours to reach 90% conversion. The following additions were made during the reaction period:

(1) At 20% conversion:
  2 parts acrylonitrile
  0.125 part mercaptan
(2) At 35% conversion, 3 parts acrylonitrile
(3) At 50% conversion:
  3 parts acrylonitrile
  0.125 part mercaptan Samples taken at various conversions during this run contained the following amounts of combined nitrile:

| Per Cent Conversion | Per Cent Nitrile |
| --- | --- |
| 21 | 16.5 |
| 36 | 16.9 |
| 69 | 16.5 |
| 92 | 16.2 |

It may readily be seen from these data that the product formed was very uniform in nitrile content.

It becomes increasingly difficult to prepare copolymers of butadiene and acrylonitrile of satisfactory properties as the proporton of nitrile in the copolymer is decreased. However, by adding 40% of the nitrile used in an overall 90/10 feed of butadiene-acrylonitrile, in increments in accordance with the present invention, a copolymer containing only 9% combined acrylonitrile was obtained which had fairly good properties.

*Example III*

A copolymer of butadiene and acrylonitrile was prepared according to the following recipe:

200 parts water
90 parts butadiene
6 parts acrylonitrile
5 parts sodium soap of tallow acids
0.6 part potassium persulfate
0.275 part mercaptans prepared from commercial lauryl alcohol During the run, which was carried out at 95–105° F., one additional part of nitrile added at 20, 35, 50 and 65% conversion making the overall feed ratio 90/10. The product obtained was compounded in the following recipe:

100 parts polymer
5 parts zinc oxide
1.5 parts stearic acid
1.5 parts sulfur
1.25 benzothiazyl disulfide
0.25 part diphenyl guanidine
50 parts Kosmobile 66, carbon black The mixture was vulcanized at 287° F. Data:

| Cure Time | Tensile | Modulus at 300% | Per Cent Elongation |
| --- | --- | --- | --- |
| | Pounds | | |
| 15′ | 1,350 | 800 | 450 |
| 30′ | 3,300 | 1,900 | 430 |
| 60′ | 3,050 | 2,050 | 400 |
| 120′ | 3,000 | 2,300 | 360 |

The raw polymer had a Williams plasticity of 120–27, and although it milled and extruded more difficultly than a copolymer of like plasticity containing 26% of acrylonitrile, it processed much better than a copolymer prepared from 90–10 feed of butadiene-acrylonitrile in which all monomers were present in the initial feed.

The foregoing description contains a limited number of embodiments of the present invention. It is to be understood that the invention is not limited to these specific embodiments since numerous variations are possible without departing from the spirit and scope thereof as defined in the appended claims.

What we claim and desire to secure by Letters Patent is:

1. In the process of preparing a homogeneous emulsion copolymer containing less than 25% of combined nitrile from a diolefin having the formula $CH_2:CR.CH:CH_2$ and a nitrile having the formula $CH_2:CR'.CN$, wherein both R and R' are selected from the group consisting of hydrogen and methyl, the improvement which comprises initially emulsifying about 80 to 90 parts by weight of the diolefin and 6 to 10 parts by weight of the nitrile in water, heating the resulting emulsion of monomers to a polymerizing temperature in the presence of an oxygen-liberating catalyst and adding a further amount totalling from 4 to 11 parts by weight of the nitrile to the reaction mixture in at least two increments while the polymerization reaction is in the conversion range between 20 and 50%.

2. A process according to claim 1 wherein the diolefin is isoprene and the nitrile is acrylonitrile.

3. A process according to claim 1 wherein the diolefin is butadiene-1,3 and the nitrile is methacrylonitrile.

4. In the process of preparing a homogeneous emulsion copolymer of butadiene-1,3 and acrylonitrile containing less than 25% of combined acrylonitrile, the improvement which comprises initially emulsifying about 80 to 90 parts by weight of the butadiene and 6 to 10 parts by weight of acrylonitrile in water, heating the emulsified reaction mixture to a polymerizing temperature in the presence of an oxygen liberating catalyst and adding a further amount totaling from 4 to 11 parts by weight of acrylonitrile to the reaction mixture in at least three increments while the polymerization reaction is in the conversion range between 20 and 50%.

5. In the process of preparing a homogeneous emulsion copolymer of butadiene-1,3 and acrylonitrile containing about 21% of combined acrylonitrile, the improvement which consists of emulsifying 79 parts by weight of the butadiene and 10 parts by weight of acrylonitrile in 200 parts by weight of water in the presence of 0.3 part by weight of potassium persulfate and 0.24 part by weight of an aliphatic mercaptan containing 12 to 14 carbon atoms per molecule, agitating the emulsified reaction mixture at 35° C., at 20% conversion adding 3 parts by weight of acrylonitrile and 0.12 part by weight of the said mercaptan to the reaction mixture while maintaining the mixture under the aforesaid polymerization conditions, at 35% conversion adding 4 more parts by weight of acrylonitrile to the reaction mixture and continuing the polymerization reaction, and finally at 50% conversion adding 4 more parts by weight of acrylonitrile and 0.12 part by weight of the said mercaptan to the reaction mixture and continuing the polymerization to 73% conversion.

HAROLD J. ROSE.
BYRON M. VANDERBILT.

REFERENCES CITED

The following references are of record in the file of this patent:

UNITED STATES PATENTS

| Number | Name | Date |
|---|---|---|
| 1,973,000 | Konrad | Sept. 11, 1934 |
| 2,100,900 | Fikentscher | Nov. 30, 1937 |
| 2,278,415 | Arnold | Apr. 7, 1942 |
| 2,281,613 | Wollthan | May 5, 1942 |
| 2,393,206 | Vanderbilt | Jan. 15, 1946 |
| 2,395,649 | Wagner | Feb. 26, 1946 |
| 2,404,817 | Strain | July 30, 1946 |
| 2,434,536 | Arundale | Jan. 13, 1948 |
| 2,447,810 | Mowry | Aug. 24, 1948 |

OTHER REFERENCES

India Rubber World, April 1944, page 79.